United States Patent [19]

Ebeling et al.

[11] Patent Number: 4,661,130

[45] Date of Patent: Apr. 28, 1987

[54] ABSORBER FOR DEHYDRATING GAS USING DESICCANTS

[76] Inventors: Harold O. Ebeling; Joseph D. Honerkamp, both of 4900 S. Lewis, Tulsa, Okla. 74105

[21] Appl. No.: 849,207

[22] Filed: Apr. 7, 1986

[51] Int. Cl.$^4$ ............................................. B01D 53/14
[52] U.S. Cl. ...................................... 55/234; 55/255; 55/256; 261/114.2
[58] Field of Search ........................................ 53/29–32, 53/48, 89, 90, 95, 185, 227, 234, 255, 256, 233; 261/114 A; 55/259, 257 R

[56] References Cited

U.S. PATENT DOCUMENTS 4,375,977  3/1983  Honerkamp et al. .................. 55/234
4,432,779  2/1984  Honerkamp et al. .................. 55/233

Primary Examiner—Charles Hart
Attorney, Agent, or Firm—Head Johnson Stevenson

[57] ABSTRACT

An improved absorber for dehydrating gas having water entrained therein utilizing liquid desiccants, the absorber being in the form of an upright cylindrical vessel having an upper and a lower partition dividing the vessel into an upper zone, a middle zone and a lower zone, the upper zone having a gas inlet therein and functioning as a desurging zone and the upper zone having a distribution gas outlet. A gas distribution conduit exteriorly of the vessel conducts the gas from the upper zone into the lower zone. A plurality of short length cylindrical members extend through the lower partition and are covered above the partition with cups. Above the lower partition is a quantity of packing and above the packing, in the middle zone, is a liquid desiccant inlet and above that, a dehydrated gas outlet. By means of a liquid desiccant outlet and an equalizer conduit connected to a branch fitting the level of liquid desiccant in the middle zone is controlled, the level being preferably less than the full height of the packing in the middle zone. Gas flows upwardly in the middle zone while liquid desiccant flows downwardly, the water in the gas being absorbed so that the gas flowing out the outlet is substantially dehydrated.

4 Claims, 3 Drawing Figures

4,661,130

ABSORBER FOR DEHYDRATING GAS USING DESICCANTS

SUMMARY OF THE INVENTION

Most natural gas produced from wells has water entrained with it. It is highly desirable that the water be extracted before the gas is introduced into pipelines for transmission to areas of processing or gas consumption since the water entrained in gas can be extremely troublesome. For instance, water in a pipeline can accumulate in low places and in cold weather freeze to block the pipeline. In addition, the processing of gas to place it in condition for use by ultimate consumers is simplified if the gas is dry. For these reasons it is a common expedient in the petroleum industry to dehydrate gas in the field and for this purpose gas dehydrators have been designed and developed. For background information relative to gas dehydration reference may be had to U.S. Pat. Nos. 4,375,977 and 4,432,779. Each of these patents disclose gas dehydrators employing a liquid desiccant, such as glycol. The dehydrators disclosed in these references have functioned extremely satisfactorily and effectively in actual operation in the field for the removal of water from raw gas. The systems revealed in these two prior issued patents include piping within the interior of the vessels to convey gas and liquid from one area to another. Placing piping internally of a vessel substantially increases the complexity of and therefor the of manufacturing the vessel.

The present invention is directed towards an improved gas dehydrator which employs the basic principles of these two prior issued patents, but in an arrangement wherein the internal construction of the dehydrator is greatly simplified, thereby allowing the principles of these two previously issued patents to be employed in a less expensive dehydrator while retaining the advantageous features of the previous designs.

The improved dehydrator of this invention functions as an absorber for contacting raw gas having water therein with liquid desiccant. The dehydrator is in the form of an upright vessel having a lower and upper partition therein defining an upper zone, a middle zone and a lower zone. The vessel has a raw gas inlet and a gas distribution outlet above the upper partition communicating with the upper zone so that the upper zone functions as a desurger. The vessel has a distribution gas inlet below the lower partition communicating with the lower zone and a dehydrated gas outlet below the upper partition communicating with the upper part of the middle zone. An external gas distribution conduit connects the gas distribution outlet and the distribution gas inlet. A liquid desiccant inlet is formed in the vessel between the partitions communicating with the middle zone and a liquid desiccant outlet below the lower partition which communicates with the lower zone. An equalizer opening is formed in the vessel communicating with the middle zone below the gas outlet and above the glycol inlet.

The upper partition is impervious and the lower partition has a desiccant outlet opening in it and a plurality of gas inlet openings.

An external vertical desiccant equalizer conduit is connected at its lower end to the desiccant outlet and at its upper end to the equalizer opening. The equalizer conduit has a branch outlet intermediate its upper and lower end and the height of this branch outlet regulates the height of liquid desiccant in the middle zone.

An interior spent desiccant conduit is positioned within the lower zone connecting at one end to the lower partition desiccant outlet opening and at the other end with the desiccant outlet formed in the vessel.

A short length vertical cylindrical member is supported in each of the gas inlet openings in the lower partition, the lower end of each cylindrical member extending below the lower partition and the upper end of each extending above the lower partition. A cap covers the upper portion of each of the cylindrical members, each cap having passageways therein below the upper end of the cylindrical member. Packing is positioned within the vessel middle zone supported on the lower partition, the packing extending approximately one-half the height of the middle zone, as an example.

Raw gas flows from the upper desurging zone, through the gas distribution conduit into the lower zone. From the lower zone the gas flows upwardly through the cylindrical members and caps into the middle zone. In the middle zone the gas flows upwardly through the packing and the liquid desiccant where water is absorbed by the desiccant. The gas being thereby dehydrated passes upwardly through the upper portion of the middle zone and out the dehydrated gas outlet.

Liquid dessicant, such as glycol, is injected through the desiccant entry to flow on top of the packing and downwardly through the lower portion of the middle zone towards the desiccant outlet. The desiccant thereby flows in the direction opposite to the upward flow of the gas to more effectively and thoroughly contact the gas with the liquid desiccant to extract the water from it.

The entire dehydrator is arranged to achieve highly effective gas and liquid flow paths employing a minimum of internal piping.

A better understanding of the invention will be had by reference to the following description and claims, taken in conjunction with the attached drawings:

DETAILED DESCRIPTION OF THE PREFERRED EMBODIMENT

Figure 1:
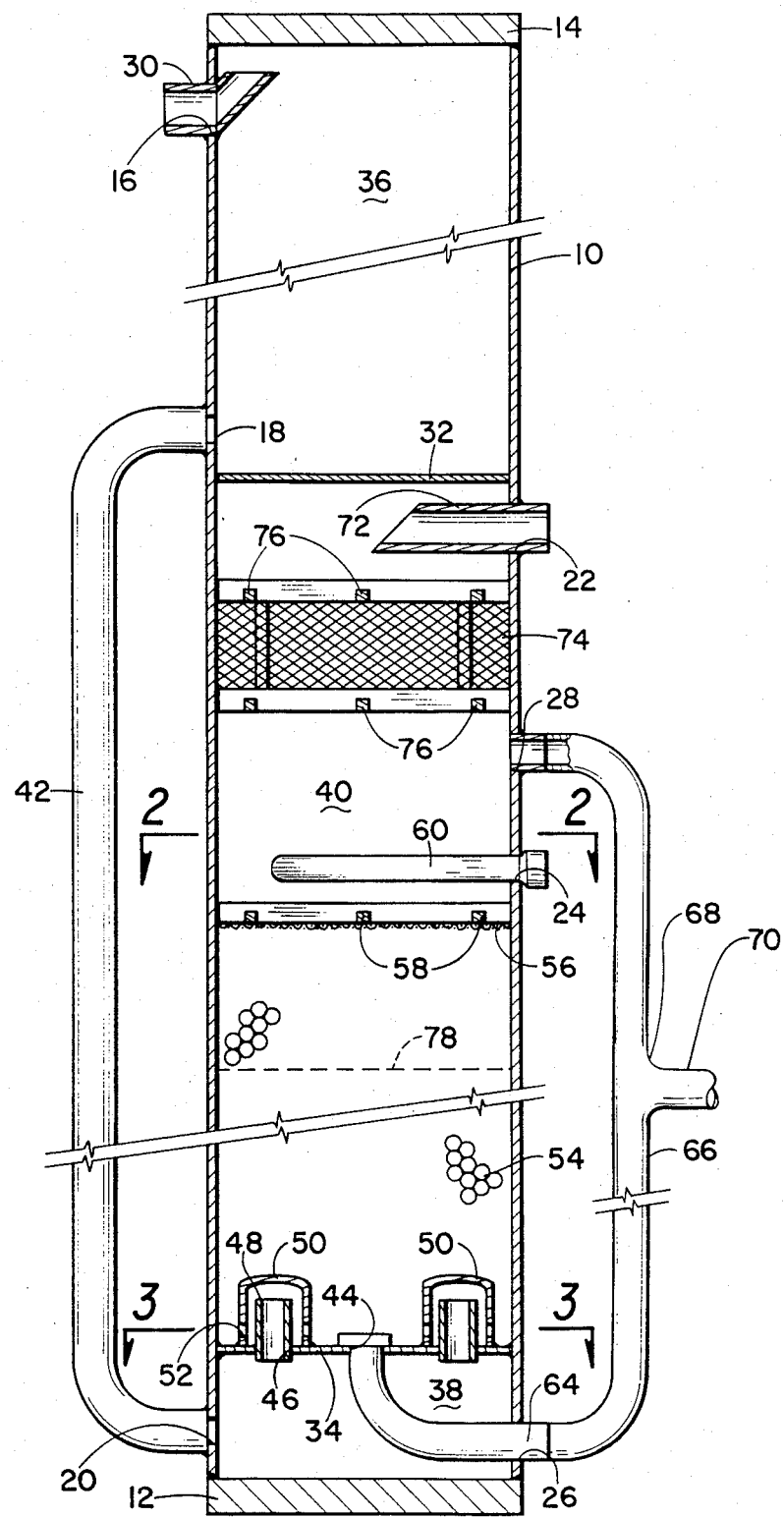
FIG. 1 is an elevational cross-sectional view of an upright dehydrator vessel and is a preferred embodiment of the invention.

Referring to the drawings, the improved absorber of this invention is in the form of an upright cylindrical vessel 10 having a bottom 12 which serves as a base and typically rests on a pad on the earth. A top 14 closes the upper end of the vessel.

The vessel 10 has a number of openings in the side wall thereof, as follows: a raw gas inlet opening 16; a distribution gas outlet 18; a distribution gas inlet 20; a dehydrated gas outlet 22; a desiccant inlet 24; a desiccant outlet 26; and an equalizer opening 28.

An inlet gas conduit 30 is received in the raw gas inlet 16 and delivers gas to the interior of the vessel.

The interior of the vessel is divided into zones by means of an upper partition 32, and a lower partition 34. Thus, the vessel has an upper zone 36 which functions as a desurging zone, a lower zone 38 and a middle zone 40.

An external gas distribution conduit 42 connects the distribution gas outlet 18 with the distribution gas inlet 20 so that raw gas, that is, gas having water entrained therein, flows into the vessel through inlet gas conduit 30 and into the upper zone 36. From the upper zone 36 it flows by way of the gas distribution conduit 42 into the lower zone 38.

Figure 3:
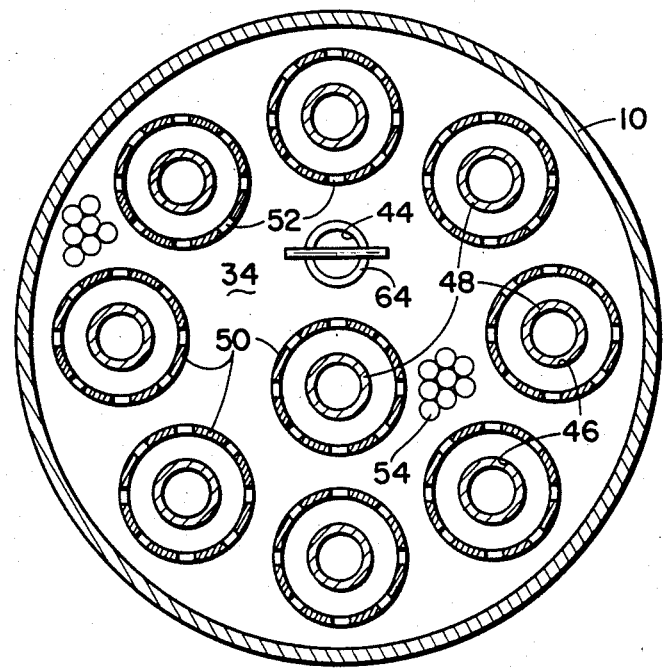
FIG. 3 is a cross-sectional view taken along the line 3—3 of FIG. 1 as showing the arrangement of the cylindrical members and caps on the lower partition.

Formed in the lower partition 34 is a desiccant outlet opening 44 and a plurality (nine being shown in FIG. 3) of gas inlet openings 46. Received in each gas inlet opening 46 is a short length vertical cylindrical member 48, each of which extends slightly below partition 34 and to a greater height above partition 34. Affixed to the upper surface of the lower partition 34 is a cap 50 for each cylindrical member 48, each of which is of an interior diameter larger than the exterior diameter of the cylindrical members and of height greater than the height of the cylindrical members. Each of the caps has, in its lower portion thereof, openings 52 so that gas may flow upwardly from the lower zone 38 through the cylindrical members 48, into the interior of caps 50 and out through openings 52 into middle zone 40.

Packing 54 is positioned within the middle zone 40 and rests on lower partition 34, the packing surrounding caps 50. The packing extends in height to approximately one-half of the height of the middle zone 40. Packing 54 may include pull rings, saddles, ceramic balls, or any other type of a wide variety of material commonly employed for this purpose. To retain packing 54 a screen 56 is secured within the vessel and held in position by structural bars 58. The screen allows gas to pass upwardly therethrough but retains the packing in position in the lower portion of zone 40.

Figure 2:
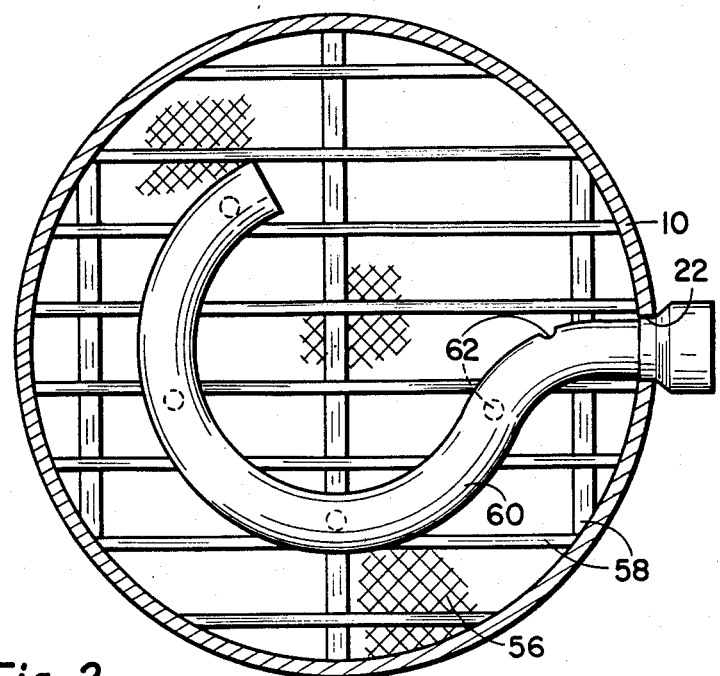
FIG. 2 is a cross-sectional view taken along the line 2—2 of FIG. 1 as showing the desiccant distribution pipe positioned above the packing in the vessel middle zone.

A desiccant distributor pipe 60 is positioned in zone 40 above packing 54 and communicates with the desiccant inlets 24. As seen in FIG. 2, the desiccant is provided with a plurality of small openings 62 by which fluid desiccant projected through the pipe is spread upon the top of screen 56 to pass downwardly through packing 54.

Positioned within the lower zone 38 is a spent desiccant conduit 64, one end of which is connected to the desiccant outlet opening 44 in partition 34 and the other end is connected to the vessel desiccant outlet 26. Positioned exteriorly of vessel 10 and communicating between the desiccant outlet 26 and the equalizer opening 28 is a desiccant equalizer conduit 66 which has a branch fitting 68 connected to a desiccant return line 70.

A gas outlet conduit 72 extends within the dehydrated gas outlet opening 22 and may be connected to piping by which the dehydrated gas is carried to a pipeline or other processing equipment.

Positioned between the desiccant distributor pipe 60 and a gas outlet conduit 72 is a mist extractor 74, which may be of a variety of constructions employed in dehydrators which provide a large surface area to intercept any droplets of desiccant which may be carried upwardly by the moving gas stream and to permit the droplets to coalesce into sufficiently large droplets that they fall back down onto the packing 54. Mist extractors are supported within the vessel with horizontal bars 76.

OPERATION OF THE IMPROVED ABSORBER

Fresh liquid desiccant, that is, a liquid having capability of absorbing water from gas, such as glycol, is pumped into the interior of the vessel and discharged from desiccant distributor pipe 60. The liquid desiccant falls downwardly into the vessel filling up the lower portion of middle zone 40 and filling the lower zone 38. The height of the desiccant rises within the vessel to the height of the branch fitting 68, the normal desiccant height being indicated by the dotted lines 78. During operation a continuous supply of dehydrated desiccant continuously flows downwardly from the desiccant discharge pipe 60, through packing 54 and through the spent desiccant conduit 64, upwardly in the lower portion of the equalizer conduit 66 and outwardly through the desiccant return lines 70. In the typical operation of the absorber the spent desiccant in line 70 is treated to extract water therefrom, such as by heating, and the dehydrated dessicant is returned through the desiccant distributor pipe 60.

Raw gas, having water entrained therein, enters the vessel through the inlet gas conduit 30 and into the upper zone 36. The large volume of the upper zone functions as a desurger, that is, it absorbs and smooths out pressure ripples in the gas flow. The raw gas flows out of zone 36 and downwardly through the gas distribution conduit 42 into the lower zone 38. When it enters the lower zone 38 desiccant therein is displaced downwardly sufficient to allow the raw gas to enter the lower ends of the cylindrical member 48 and to flow upwardly through the cylindrical members. Thus, the gas contacts the liquid desiccant within the lower zone 48 and this contact is achieved with pressure required to displace the desiccant sufficient to allow the gas to flow through the lower ends of the cylindrical members. The gas passes upwardly through the cylindrical members and through the interior of caps 50 and out through the openings 52. The function of the caps is to prevent the packing 58 from passing downwardly into the lower zone 38 and to cause a wide spread dissemination of the upwardly passing gas into the lower portion of middle zone 40. As the gas passes upwardly through the middle zone it moves against the downward flow of desiccant through the packing 40, the portion below line 78 of which is immersed in liquid desiccant. This counterflow thoroughly contacts the gas with liquid desiccant allowing water carried by the gas to be absorbed by the desiccant. As the gas continues to move upwardly it passes through packing 54 above the liquid level line 78 and encounters fresh liquid desiccant which is drifting downwardly as it is discharged from pipe 70.

The gas passes out of the packing through the screen 56 and into the unobstructed portion of middle zone 40 above the desiccant discharge pipe 60. In this quiescent zone any entrapped droplets of liquid desiccant are free to fall out of the rising gas column.

The gas column continues to move upwardly through mist extractor 74 where any small droplets of entrained desiccant are allowed to collect and coalesce into large droplets to fall back into the lower portion of zone 40. The gas passing upwardly through mist extractor 74 is substantially free of water and entrained desiccant and passes out of the vessel through gas outlet conduit 72.

Thus, the absorber very thoroughly and intimately contacts raw gas having water entrained therein with liquid desiccant so as to cause the water to be absorbed. A unique feature of the improved absorber as herein described is that piping within the absorber is kept to a minimum and to ultimate simplicity. The movement of gas to put it into contact with dessicant is carried out externally of the absorber, as contrasted with the techniques employed in U.S. Pat. Nos. 4,375,977 and 4,432,779. Further, a minimal number of interior components are employed to achieve very thorough mixing of the gas with liquid desiccant. Thus, the absorber is substantially less difficult, time consuming and expensive to construct as compared to the prior art while achieving comparable dehydration results.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An improved absorber for contacting raw gas having water therein with a liquid desiccant, comprising:

an upright vessel having a lower and an upper partition therein defining an upper zone, a middle zone and a lower zone, the vessel having a raw gas inlet and a gas distribution outlet therein above said upper partition communicating with said upper zone, the vessel having a distribution gas inlet therein below said lower partition communicating with said lower zone, a dehydrated gas outlet therein bleow said upper partition communicating with the upper part of said middle zone, a liquid desiccant inlet therein between said partitions communicating with said middle zone, a desiccant outlet therein below said lower partition communicating with said lower zone and an equalizer opening therein communicating with said middle zone below said gas outlet and above said dessicant inlet, the upper partition being impervious and the lower partition having a desiccant outlet opening therein and a plurality of gas inlet openings therein;

a vertical gas distribution conduit exterior of said vessel having the upper end thereof connected to said distribution gas outlet and the lower end thereof connected to said distribution gas inlet;

a vertical desiccant equalizer conduit connected at its lower end to said desiccant outlet and at its upper end to said equalizer opening and having a desiccant branch outlet intermediate its upper and lower ends;

a spent desiccant conduit within said lower zone connected at one end to said lower partition desiccant outlet opening and at the other end with said vessel desiccant outlet;

a short length, vertical, cylindrical member supported in each of said gas inlet openings in said lower partition, the upper ends of each extending above said lower partition;

a cap covering the upper portion of each of said cylindrical members, the internal diameter of the caps being greater than the external diameter of said cylindrical members, the caps having passageways therein below the upper ends of said cylindrical members; and packing within said vessel middle zone supported on said lower partition and of depth greater than the height of said caps, whereby raw gas flows from said upper zone through said gas distribution conduit into said lower zone and upwardly through said cylindrical members and caps into said middle zone, and thence upwardly through said packing and liquid desiccant where water is absorbed by the dessicant, the gas being thereby dehydrated and passes out through said dehydrated gas outlet, the liquid desiccant flowing in the direction opposite to the gas in said middle zone.

2. An improved absorber according to claim 1 including:

a horizontal desiccant distribution pipe positioned within said middle zone above said packing and connected to said desiccant entry, the distribution pipe having a plurality of small diameter openings therein by which desiccant is discharged onto the top of said packing.

3. An improved absorber according to claim 1 including:

a mist extracter section within said middle zone above said desiccant entry and below said dehydrated gas outlet.

4. An improved absorber according to claim 1 wherein the lower end of each cylindrical member extends below said lower partition whereby liquid dessicant in said lower zone must be displaced to permit gas to flow upwardly through said cylindrical members into said middle zone.

* * * * *